United States Patent
Yagawa

(10) Patent No.: US 7,464,070 B2
(45) Date of Patent: Dec. 9, 2008

(54) DATABASE QUERY OPERATIONS USING STORAGE NETWORKS

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 10/630,595

(22) Filed: Jul. 29, 2003

(65) Prior Publication Data

US 2005/0027693 A1  Feb. 3, 2005

(51) Int. Cl.
  *G06F 7/00* (2006.01)
(52) U.S. Cl. .................. 707/2; 707/3; 709/203; 709/242
(58) Field of Classification Search ............ 707/1, 707/2; 709/203, 242
  See application file for complete search history.

(56) References Cited

U.S. PATENT DOCUMENTS

| | | | |
|---|---|---|---|
| 5,950,203 A * | 9/1999 | Stakuis et al. ............ | 707/10 |
| 6,085,223 A | 7/2000 | Carino, Jr. et al. | |
| 6,205,440 B1 | 3/2001 | Nusbickel | |
| 6,292,800 B1 * | 9/2001 | Eldreth ............... | 707/10 |
| 6,732,117 B1 | 5/2004 | Chilton | |
| 6,985,956 B2 * | 1/2006 | Luke et al. ............ | 709/229 |
| 7,089,301 B1 * | 8/2006 | Labio et al. ........... | 709/224 |
| 2001/0044748 A1 * | 11/2001 | Maier .................. | 705/26 |
| 2002/0059173 A1 | 5/2002 | Honda | |
| 2002/0073175 A1 | 6/2002 | DeKoning et al. | |
| 2002/0083120 A1 * | 6/2002 | Soltis ................. | 709/200 |
| 2002/0107835 A1 | 8/2002 | Coram et al. | |
| 2002/0133539 A1 * | 9/2002 | Monday ............... | 709/203 |
| 2003/0009518 A1 * | 1/2003 | Harrow et al. ......... | 709/203 |
| 2003/0050966 A1 * | 3/2003 | Dutta et al. .......... | 709/203 |
| 2003/0154236 A1 * | 8/2003 | Dar et al. ............ | 709/201 |
| 2003/0158839 A1 * | 8/2003 | Faybishenko et al. .... | 707/3 |
| 2003/0208621 A1 * | 11/2003 | Bowman .............. | 709/242 |
| 2004/0044727 A1 * | 3/2004 | Abdelaziz et al. ...... | 709/203 |
| 2005/0015415 A1 * | 1/2005 | Garimella et al. ...... | 707/204 |

* cited by examiner

*Primary Examiner*—Tim T Vo
*Assistant Examiner*—Mahesh H Dwivedi
(74) *Attorney, Agent, or Firm*—Townsend and Townsend and Crew LLP

(57) ABSTRACT

A system for enabling more efficient processing of query operation of a database includes a query provider coupled to a database system, by a network. A storage system is coupled to each of the query provider and the database system. The database system includes a return path selector which chooses whether to return the results of queries to the query provider by storing the results into the shared storage system, or by sending them over the network. There may also be provided the capability of storing query data in the storage system for use by the database in executing the queries. A key is used to locate the results or the query data in the storage system, and another information field is used to control access to the stored query data and/or results.

33 Claims, 13 Drawing Sheets

DATABASE QUERY OPERATIONS USING STORAGE NETWORKS

BACKGROUND OF THE INVENTION

This invention relates to methods and apparatus for querying databases and obtaining the results from such queries. In a typical database management system, an application system is used to generate queries and present results retrieved in response to those queries from a database system. Numerous vendors such as Oracle and IBM, provide relational database management systems. Many vendors also provide application systems or application servers, for example, implementing them as a Java Servlet. An example of a query is a request made in structured query language or SQL.

FIG. 1 is a block diagram of a typical current state of the art system in which an application system queries a database system. As shown there, the application system 10*b* is connected to a database system 40*b* over a network 1*b*. Network 1*b* will typically be provided by a local area network (LAN) or a wide area network (WAN). Both the application system in 10*b* and the database system 40*b* are connected to a storage system 80*b*. Although in FIG. 1 the storage system is depicted as being coupled to both the application system and the database system, in many installations separate storage systems will be provided for each of the application system and the database system. Another network 2*b* is dedicated to data transfer between the application and database system and the storage system. The communication protocol for the storage system will often be Fibre Channel (FC), network file system (NFS) or other file systems such as iSCSI or other IP-storage protocols. While FIG. 1 illustrates the system as encompassing only a single application system 10*b* and database system 40*b*, in many conventional implementations there are configurations in which several application system and several database systems are interconnected.

In FIG. 1 the primary components of the application system include a query requester 20*b* that, in response typically to a user request, creates and sends a query to the database system 40*b* through the local area network 1*b*. The application system also typically includes some means for receiving the results 30*b*, typically through the LAN connection 35*b*. A typical prior art system the database system 40*b* includes a query receiving means 50*b* for receiving queries from the application system 20*b* through the LAN. It also includes query executing means 60*b* to analyze the content of the query and execute the appropriate processes. Once the answer to the query has been determined, a process for returning the results 70*b* returns the result of the query to the application system 10*b* so that the answer to the query may be presented to the user.

Application and database systems such as depicted in FIG. 1 are capable of handling enormous amounts of data, for example, as might be found in a bank or an airline reservation system. This enormous amount of data is stored in a storage system 80*b* which includes database volumes 81*b*, which manages the database files 82*b*. The database files contain the actual data, such as the ticket numbers of all the passengers on a given flight.

The system such as depicted in FIG. 1 operates by having a query 5*b* sent from the application system to the database system through the local area network, or other network. As shown by arrow 7*b*, the database system then interacts with the storage system to retrieve the desired information, and return it as shown by arrow 6*b* over the local area network back to the application system. In FIG. 1 the most significant processes with regard to the invention described below are shown in the darker rectangles. These processes include sending the query 25*b* (or the query in the form of data), receiving the query (or the query in the form of data) 55*b*, returning the result data 75*b*, and receiving the result data 35*b*.

A substantial disadvantage of the system depicted in FIG. 1 is the requirement that the data flow back and forth over the local area network. When the result from the database system to be provided to the application system contains a large quantity of data, the local area network becomes a bottleneck for overall performance. For example, if the query is for a list of all of the passengers who have traveled on a particular airline in the last ten years, a very large amount of data will be retrieved. In these situations, the large amount of data required to traverse the network limits the operating speed of the overall database system. In addition, although less frequently, sometimes the query itself contains a large amount of data and this also creates a bottleneck.

Accordingly, what is needed is a system for implementing queries of databases which avoids the bottlenecks introduced by sending the query over a local area network, or retrieving large amounts of data in response to the query over the network.

BRIEF SUMMARY OF THE INVENTION

This invention provides a system in which query data and query results, rather than being transferred between a database and a application system are mutually accessed by being stored in a shared volume of a storage network. A key is used to specify the location for the stored data and enable access to it by the intended user of the data. The system minimizes use of the LAN, or other type of local, wide-area, internet, or other network connection, for the transfer of large amounts of data, thereby improving operation of large database systems.

In one embodiment a system for enabling queries to a database to be processed includes an application system for providing queries to a database system coupled to the application system via a network, a storage system coupled to each of the application system and the database system, and a return path selector coupled to the database system for selecting a return path over which to return results from queries made to the database system. The return path selector selects between the network connection and the shared storage system, usually based on the size of the result file to be transferred. The return path selector may choose a return path based on a measurement of throughput of the network connection. The storage system may be coupled to the application system and the database system using a switch or a storage network, and a database hub may be used to couple the application system and the database system.

In another embodiment the application system includes a request path selector for selecting a request path over which to send query data for requests made to the database system. The request path selector selects between the network connection or the storage system, usually based on the size of the query data file. If the storage system is selected the query data is stored there and a key sent over the network to the database system to enable access to the query data. In legacy systems a database gateway may be used in the database system, and a database access program in the application system to provide the functionality of the foregoing two embodiments. As with the preceding embodiment, the storage system may be coupled to the application system and the database system using a switch or a storage network.

In another embodiment, in a system having a query provider which provides queries to a database system over a network, the query provider and the database system being coupled to a storage system, a method of returning results to the query provider includes storing the results in the storage system and sending the address of the results over the network to the query provider. In some implementations of the system the at least one of the key and the results are encrypted. In other embodiments the query data may be stored in the storage system, either through a storage network or a switch, and its location transferred over the network to the database.

DETAILED DESCRIPTION OF THE INVENTION

This invention provides a system in which query data, rather than being sent to a database via a network or returned via a network connection between the application server and the database system, is stored in a shared volume of a storage network. The address for that stored data is then used to access it by the application system and/or the database system. In this manner the application system is permitted to access the address on the shared volume and receive through the storage network the query data and/or the result data associated with an original query.

Figure 1:
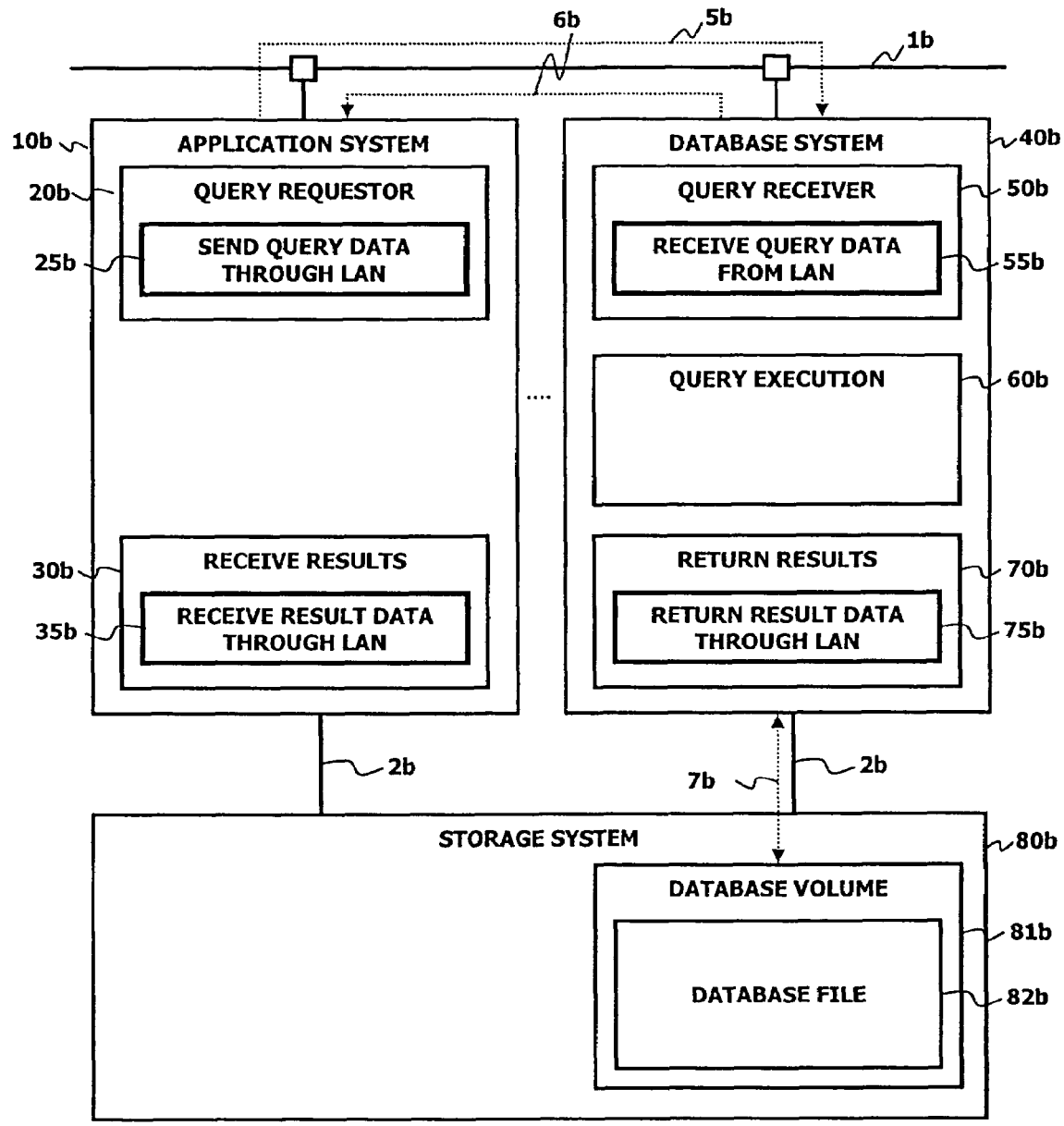
FIG. 1 is a block diagram illustrating a prior art system architecture for an application system and database system.
Figure 2:
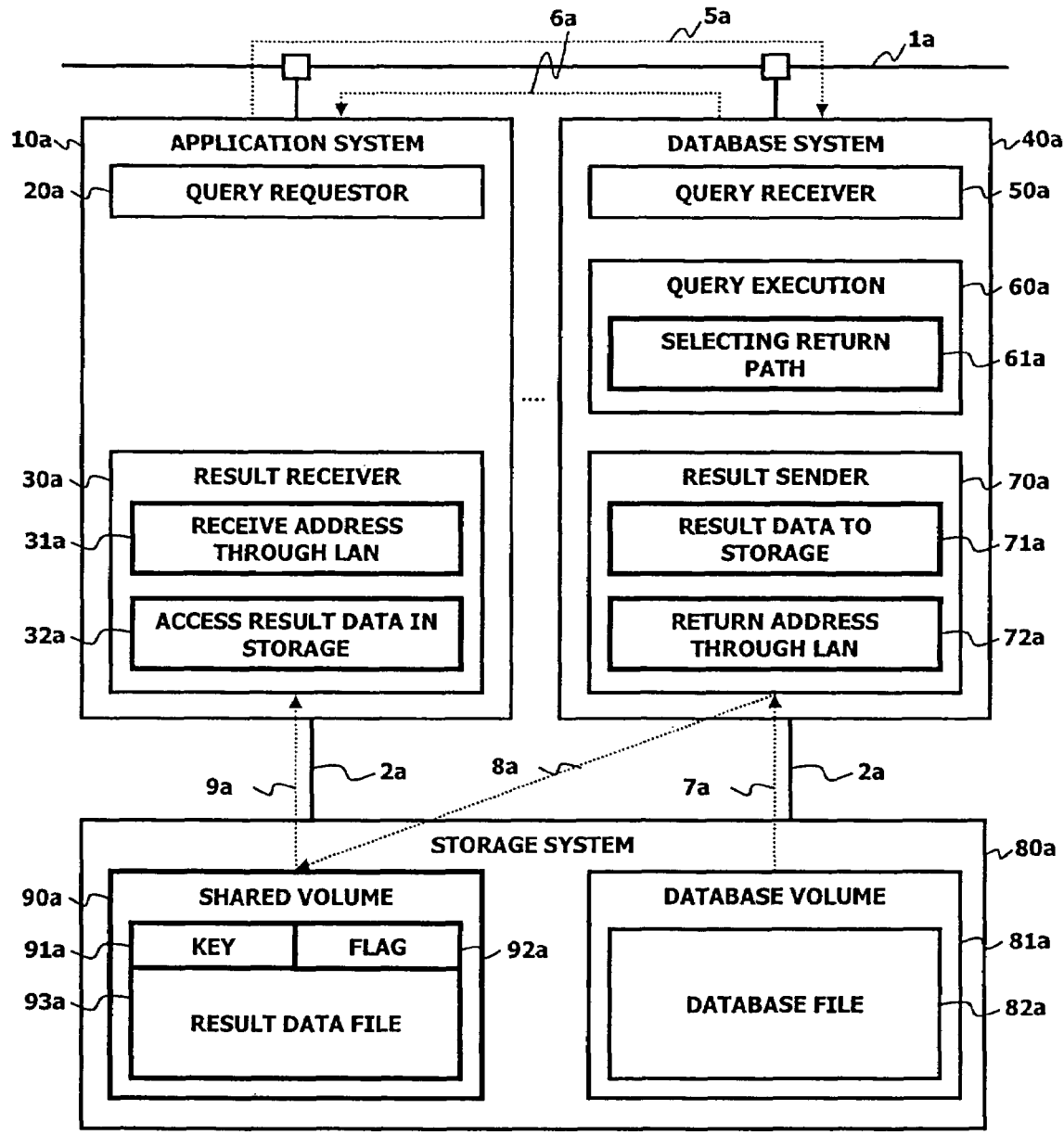
FIG. 2 is a block diagram of an embodiment in which query results are returned using a storage network.

FIG. 2 illustrates a first embodiment of the invention. In this embodiment the response time for returning large amounts of data in response to a query applied to the database system by the application system is greatly reduced. While the overall architecture shown in FIG. 2 at first appears similar to that of the prior art, some of the processes and the operations are different from the system depicted in FIG. 1.

Storage system 80a includes shared volumes 90a which are shared between the application system 10a and the database system 40a. Note that the shared volume is typically, but not necessarily distinct from the database volume 81a in which the database file 82a is stored. Shared volume 90a is shared between the application system 10a and the database system 40a using well known storage system technology. The shared volume is capable of storing the result data file 93a which is the data file created by the application of a query to the database system. That result data file has associated with it a key field 91a and a flag 92a as shown in FIG. 2.

In a typical embodiment of this invention employing shared volumes, it will be necessary to mount and un-mount the volumes depending upon their use. For example, before the application system 10a accesses the shared volume 90a, the volume needs to be mounted. Before the database system accesses the shared volume 90a, the application system must un-mount the volume 92a, and the database system must mount the volume 92a. These are conventional actions in a storage system and are not discussed further herein.

The manner of operation of the system shown in FIG. 2 is discussed next. In a well known manner, typically with input from a user addressing the application system from a terminal, a query is formulated to be applied to the database system. In general the purpose of the query will be to retrieve information from the database which is related to the particular interest of the user. For example, if the database system is storing information about product sales of a particular corporation, a query might seek all of the products sold under a particular model number between January and May of a particular year by retail outlets situated in a particular telephone area code. The query 5a, after being formulated by the user, is transmitted over a network 1a, typically a local area network or LAN, to the database system 40a. The query is received by a query receiver 50a which may buffer the query depending upon the workload of the database system at the moment, or it may otherwise pre-process the query.

Once the query is ready for execution, the query is supplied to the execution unit 60a which itself includes a process for selecting a return path 61a for the query results. This specific process employed is described below. In general, however, the process for returning results 70a will cause the results to be returned through the local area network using process 72a, or will cause them to be returned by providing data to the storage system as shown by process 71a. As will be discussed in more detail below, selection of the particular path for returning the result data will typically involve consideration of the amount of data to be returned. In the example given above, if only one, or a few records, are to be returned to the application system, they will typically, or preferably, be returned over the local area network 1a. On the other hand, if the results are voluminous, they may be returned by being stored into the shared volume 90a where they are accessible by the application system. After the results have been returned, they are received by the application server by process 30a. If the results are to be returned over the LAN, for example by process 75b in FIG. 1, they are handled in the conventional manner (shown in FIG. 1 by process 35b). On the other hand, if the results have been returned to the shared volume 90a then the result receiver 30a in the application system will receive the address of the result data file 93a from the database system 40a. The result receiver 30a may then use the address received to retrieve the result data from the shared volume 90a.

The particular processes for operation of the architecture of FIG. 2 are shown by dotted lines. The request of the query from the application system 10a to the database system 40a is illustrated by process 5a. Process 7a illustrates the access of the data from the database volume by the database system using the storage system. Process 8a shows the results of the query being stored as a result data file 93a in the shared volume 90a by use of the storage network. Process 6a illustrates the return of the address of the result data file 93 from the database system 40a to the application system 10a through the LAN. Using the address received over the LAN, process 9a illustrates the access of the result data in the storage by the application system.

As mentioned, the shared volume 90a is an aspect of the system which enables avoiding transmitting the result data through the LAN. This shared volume is formatted before the application system and the database system may access it. Typically, the size of the shared volume 90a is defined at the time it is formatted. If desired, an optional feature of the invention allows that for each result data file 93a the shared volume to maintain a key (or lock) 91a which may be unlocked by an appropriate code sent to it, as well as a flag 92a.

The code which unlocks key or lock 91a usually will be unique for each access to the database. It is exchanged between the service requesting a process in the application system and the service providing the process in the database system 40a. The key 91a helps to protect other processes from accessing the result data file 93a. Preferably the key 91a will be stored in a special area of the shared volume which is accessible using the address of the result data file 93a. Of course, if additional security is necessary or desirable, the result data itself may be encrypted in the file using the key or other desired technique.

The flag 92a records each state of the result data 93a so that the application system and the database system can access the data exclusively and appropriately without conflicting with each other. The states for the flag are Writing, Ready, Reading, and Done. The Write state is the one in which data is written to the file. During this time the application system is not permitted to access the data. Ready indicates that the data has been completely written and may now be read. Read is the state in which the data is read from the result data file by the application system. Done is the state in which all of the data has been read from the file and the process is complete. Flag 92a is stored in the special area of the shared volume 90a which is accessible using the address from the result data file 93a, or the flag may be stored in a special area of the result data file 93a itself. Preferably the shared volume will be large enough to accommodate many result files at the same time, however, this will depend upon the available density of hard disk drives and the quantity of results stored.

Next we discuss the approaches for implementing some of the steps shown in the diagram of FIG. 2. The manner in which the process of selecting a return path 61a is implemented is shown in more detail in FIG. 8. As shown there, the first step after starting the process is to retrieve the result data. The result data is obtained by applying the query received from the query receiver 50a to the database file 82a using well known query execution techniques 60a. Once the result data is obtained, the next step is to calculate the size of the result data. After this calculation, the size of the result data is compared against the threshold value at step 202. If the size is greater than the threshold value, then step 203 will be selected. Otherwise, step 204 will be selected. Step 203 chooses a return path for providing the data to the shared volume as shown by process 8a in FIG. 2. Step 204 sets the return path to be the conventional one, which is back to the application system through the LAN. This is shown by process 75b in FIG. 1.

Figure 8:
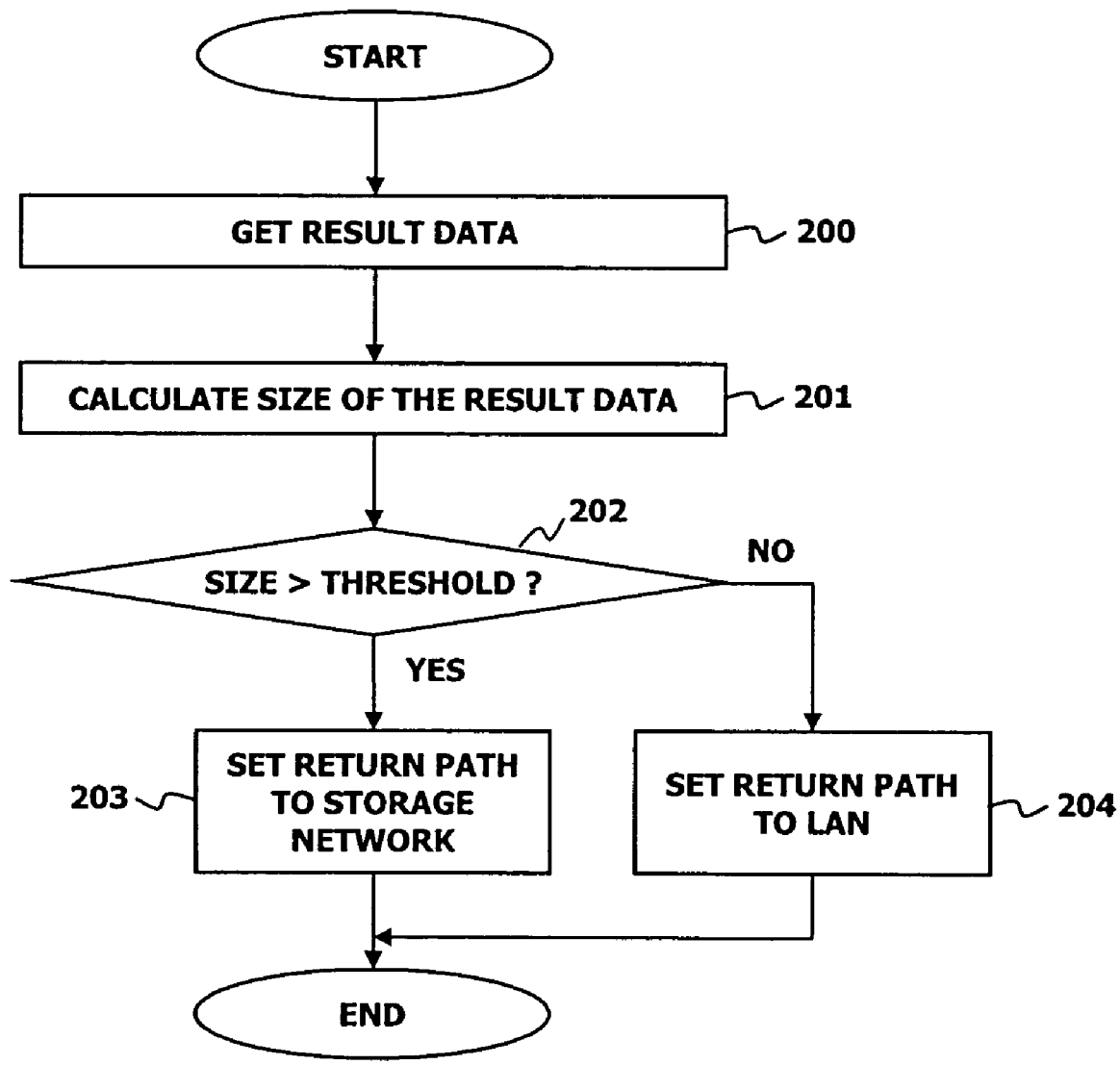
FIG. 8 is a flow diagram of a process for selecting return paths.

The threshold value for use in step 202 of FIG. 8 may be predetermined, or may be determined at the time on the basis of the current workload of the LAN or other limiting parameter. In alternative implementations the processing of setting the return path may not wait for the calculation of the size of the return data as shown by step 201. Instead, the process may make an assumption of the size of the return data based upon similar queries from the query execution history.

Figure 9:
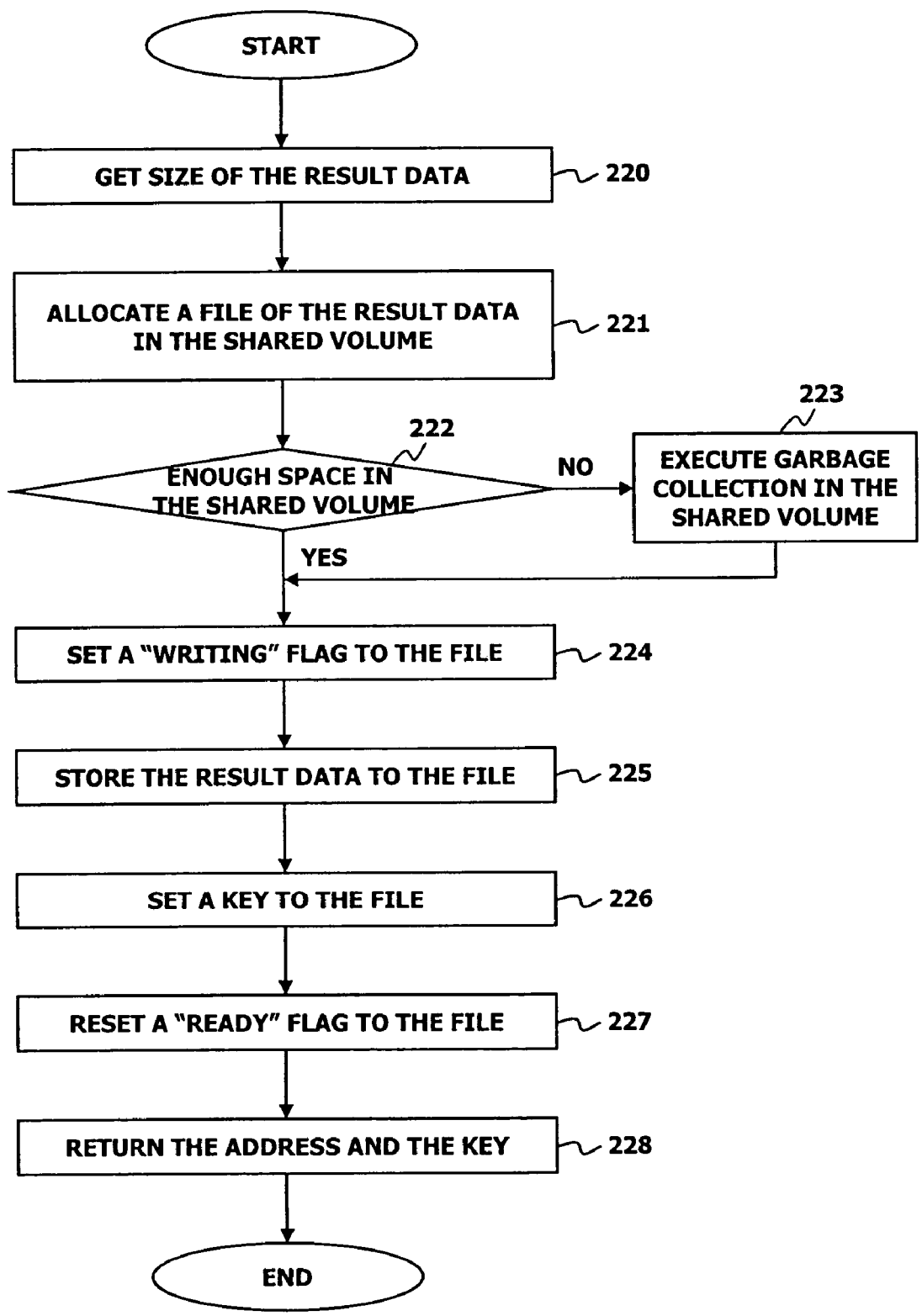
FIG. 9 is a flow diagram of a process for storing result data.

In FIG. 2 the process for sending the result data to the storage 71a is shown as a part of the return results process 70a. FIG. 9 is a more detailed diagram illustrating the process for sending the result data to the shared volume for storage. In an initial step 220 the size of the result data is calculated. Of course, if that result data size is already calculated by process 61a in FIG. 2, it is not necessary to recalculate it in step 220. Once the size of the result data is known, then in step 221 a suitable file space is allocated in shared volume 90a for the result data file 93a. As shown by step 222, if there is enough space in the shared volume, then the process flow may continue. If there is not enough space in the shared volume, the process shifts to step 223 in which "garbage collection" in the shared volume is performed to clean up the shared volume and provide additional storage space sufficient to hold the file. As mentioned earlier, if the flag for result data files previously stored on the shared volume has been set to "Done" then those files may be deleted from the shared volume to make additional space. The files may be deleted in any specified order, for example, oldest to newest, biggest to smallest, user set priority, etc.

Once enough space is available, as shown by step 224, the flag is set to Write for the particular file. This precludes access to the file by any other process while it is being written from the database system to the shared volume. After setting the flag, the data itself is stored in the shared volume. If desired, the data may be encrypted.

Once the data is stored a key is established for that file as shown by step 226. The key is unique among all of the result data files and may be created using any well known algorithm. For example, in a preferred embodiment a hash algorithm for the query message itself is used to create a key. After all the data is written to the file, the "Ready" flag is set for that file, as shown by step 227. The setting of the Ready flag enables further processes in the application system to access the result data. Finally, the process is complete when the address of the result data file 93a and the key 91a are sent back to the application system by the database system. This is shown by process 6a in FIG. 2. The process 6a of returning the address and key may be carried out in a conventional manner, except of course that the accompanying data is not transferred at the same time. If additional security is necessary, the return address and key may themselves be encrypted for transmission.

Figure 10:
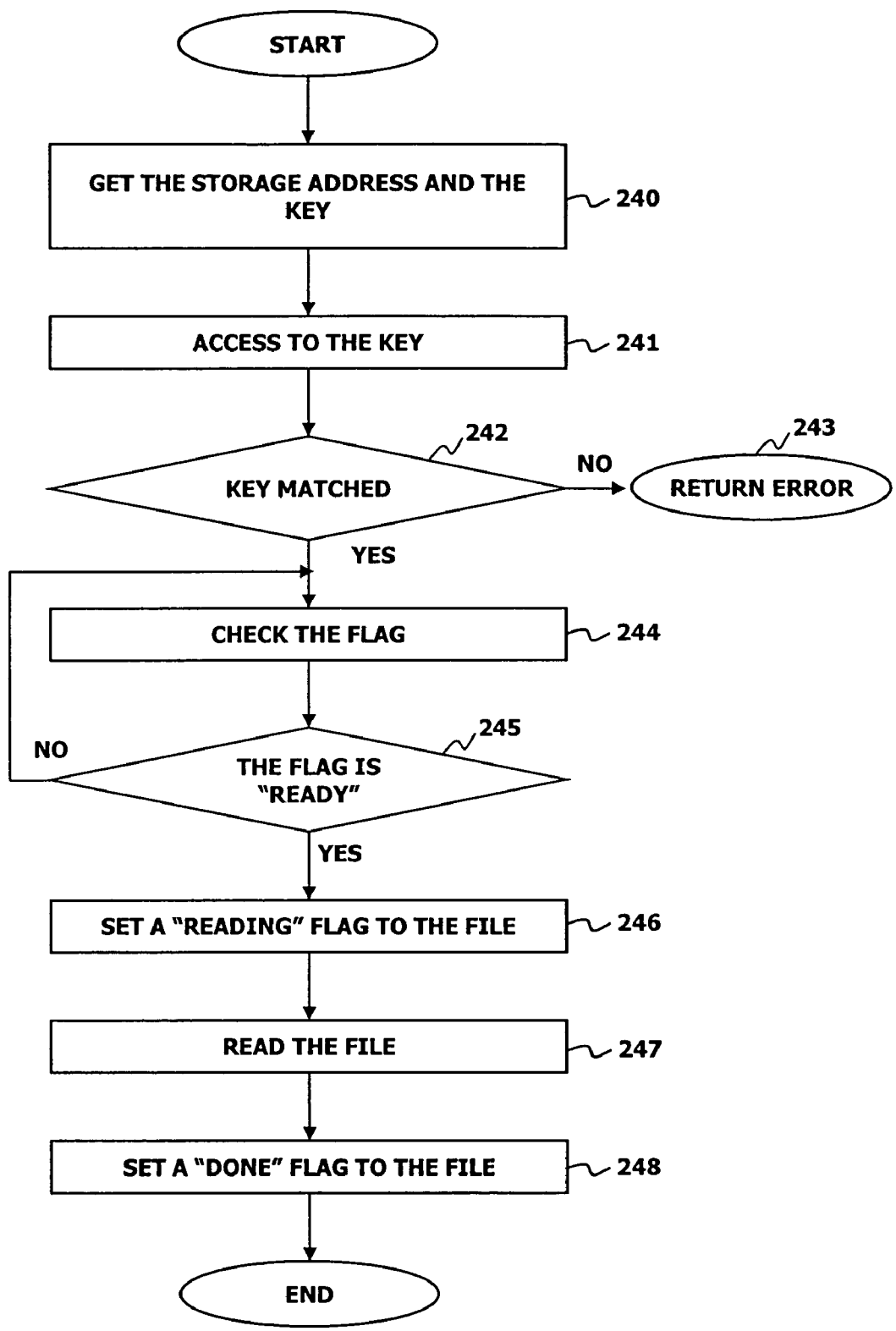
FIG. 10 is a flow diagram of a process for accessing result data.

Continuing with respect to FIG. 2, process 31a receives the address (and the key) through the LAN. The result data stored in the shared volume may then be accessed. FIG. 10 is a diagram illustrating the process for accessing the result data file 93a in the shared volume 90a. This process corresponds to process 9a and process 32a in FIG. 2.

As shown in FIG. 10, the first step 240 is to obtain the storage address and the key for the result database file from the database system through the LAN. The application system then checks to see if the key received from the LAN matches a key 91a stored in the shared volume for the different result data files 93a. Once the key is found which matches the received key, as shown by step 242, the process continues with checking the flag 92a, as shown by step 244. If the key does not match, then an error is returned. The flag is accessed using the address received. If the flag is other than "Ready" the process continues checking the flag until it becomes "Ready". This mechanism allows both the database system and the application system to exclusively access the result data file, thereby guaranteeing data integrity. To prevent an infinite loop, a counter may be employed to determine the number of times the flag is rechecked. The system then returns an error if the number of times exceeds a predefined threshold.

As shown by step 246, once the flag is set to Ready, the application system resets it to "Read" thereby precluding access to the data file by any other process. At step 247 the file is read, and decrypted if necessary. After reading, as shown by step 248, the flag is reset to "Done" to indicate that all of the data has been read from the file. As discussed earlier, the setting of the "Done" flag will allow the garbage collection step 223 to delete the file when space is required on the shared volume.

It is sometimes the situation in the use of relational databases that the user will want to re-query the result data. For example, the user may wish to narrow the results by applying an additional query, in effect adding one further limitation to the previous query. In the hypothetical situation discussed above, for example, the user may wish to narrow the query to only request sales made during the evening. In situations like this it is advantageous that the result data file 93$a$ be accessible from the database system 40$a$ to facilitate re-querying the data without need to re-execute the original query. Such a capability improves the response time to the user.

This re-querying is enabled by having the application systems send back the key in the address of the result data file 93$a$ with a subsequent re-query. When the database system receives the re-query request, the database system checks if the result data file 93$a$ for that particular query still exists in the shared volume 90$a$. If it does not exist, then the database system must re-execute the first query and either simultaneously, or as a subsequent step, execute the additional query. (The determination of the precise manner of execution of queries is defined by the database system software provider and is not discussed here.) The system then checks to assure that the appropriate key is present and that the flag is set to "Done." As before, the system will wait only a certain amount of time for the flag to be set to "Done." If the wait time exceeds the pre-determined threshold, then the system will execute the first query and then the re-query. Assuming the operation is as expected, however, the system will execute the re-query using the result data file. Then, using the above-described techniques for storing the result data file back into the shared volume, a new result data file will be stored with a new key on the shared volume for access by the application system.

Figure 3:
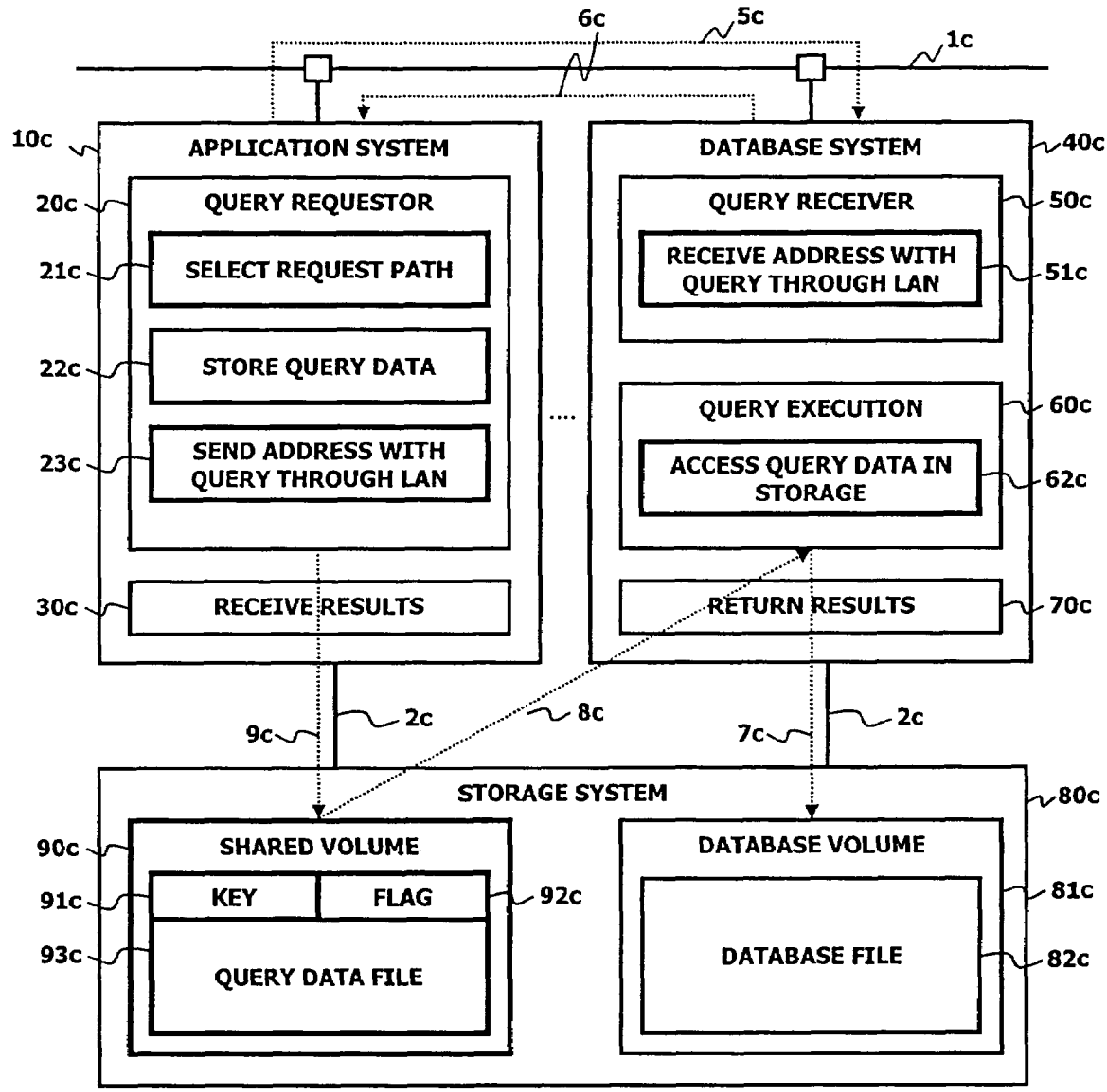
FIG. 3 is a block diagram of an embodiment in which query data is provided using a storage network.

FIG. 3 is a block diagram illustrating another embodiment of the system of this invention. This embodiment improves the response time when large amounts of query data need to be sent from the application system 10$c$ to the database system 40$c$. As shown in FIG. 3, the overall system architecture is very similar to that depicted in FIG. 2, but with some of the processes being modified. One modification is that the query requestor 20$c$ includes a process 21$c$ for selecting the request path and sending the query data to the database system 40$c$. The query requestor includes a process for storing the query data 22$c$ and sending the address for the query through the LAN 23$c$.

In the database system the query receiver 50$c$ includes a process for receiving the address with the query through the LAN 51$c$. In addition, the query execution process 60$c$ includes a process 62$c$ for accessing the query data stored in the shared volume 90$c$. As with FIG. 2, the dotted lines in FIG. 3 indicate various processes. Process 9$c$ represents storing of the query data 22$c$ as a query data file 93$c$ in the shared volume of the storage system 80$c$. As this occurs, the application system 10$c$ obtains the address of the query data file 93$c$. Process 5$c$ represents a request of the query from the application system to the database system through the LAN. The query will contain the address of the query data file 93$c$. Process flow 8$c$ represents access of the query data file using the address received from the LAN. Process 7$c$ represents sending the query data to the database volume 81$c$, while process flow 6$c$ represents a return of the result of the database process from the database system through the LAN.

Specific components of FIG. 3 are discussed next. Other than the query data file, the shared volume will have the same characteristics as in the first embodiment of FIG. 2. The query data file 93$c$ allows the exchange of query data from the application system to the database system. This is particularly useful for queries where a large amount of information is required for the query. For example, a list of thousands of telephone numbers and a single address may be the query, with the desired result being a determination of whether any of the people having those telephone numbers live at the specified address. The name of that one person can easily be returned over the LAN. In addition, the storage network can be used for circumstances in which both the data for the query and the result from the query contain large amounts of data. For example, in a situation where a list of thousands of employee identification numbers are in the query and the request is to obtain the office telephone number for each employee. Such an implementation combines the ideas depicted in FIGS. 3 and, and is a situation where both the query and the result use the storage network.

Figure 11:
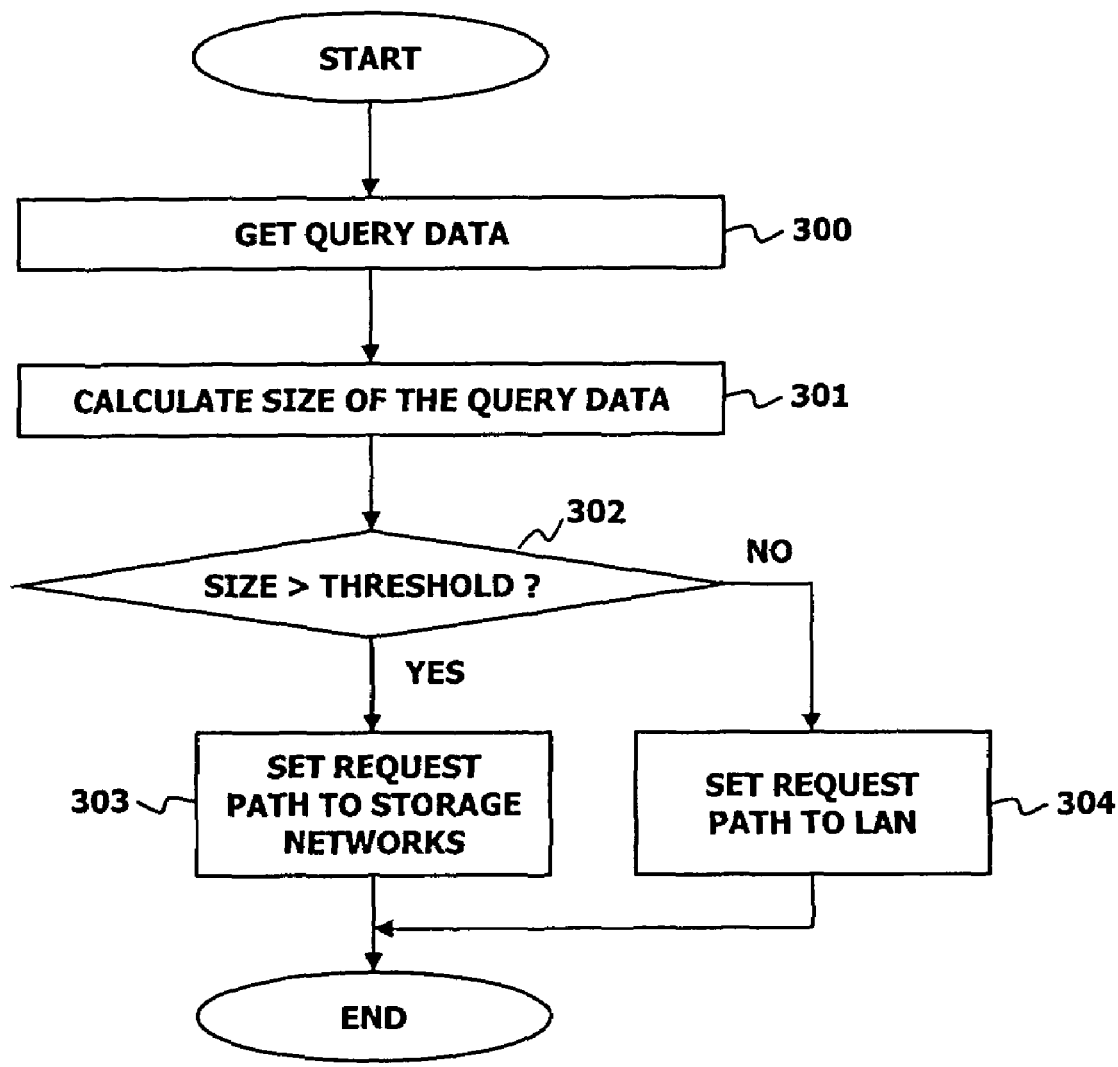
FIG. 11 is a flow diagram of a process for selecting a request path.

Another difference between the embodiment of FIG. 3 and that of FIG. 2 is the select request path process 21$c$ within query requestor 20$c$. The select request path process is described in more detail with respect to FIG. 11. As shown in FIG. 11, the process begins with collection of the query data at step 300. The size of the query data is then calculated at step 301. At step 302 the size is compared with the threshold of value at step 302. If the data file is smaller than the threshold value, then the request is sent over the LAN to the database system as shown by step 304. On the other hand, if the size is large, then the request path will be set to be the storage network. As before, the threshold for this choice may be set as an absolute number, or based on relative availability of various system resources.

Figure 12:
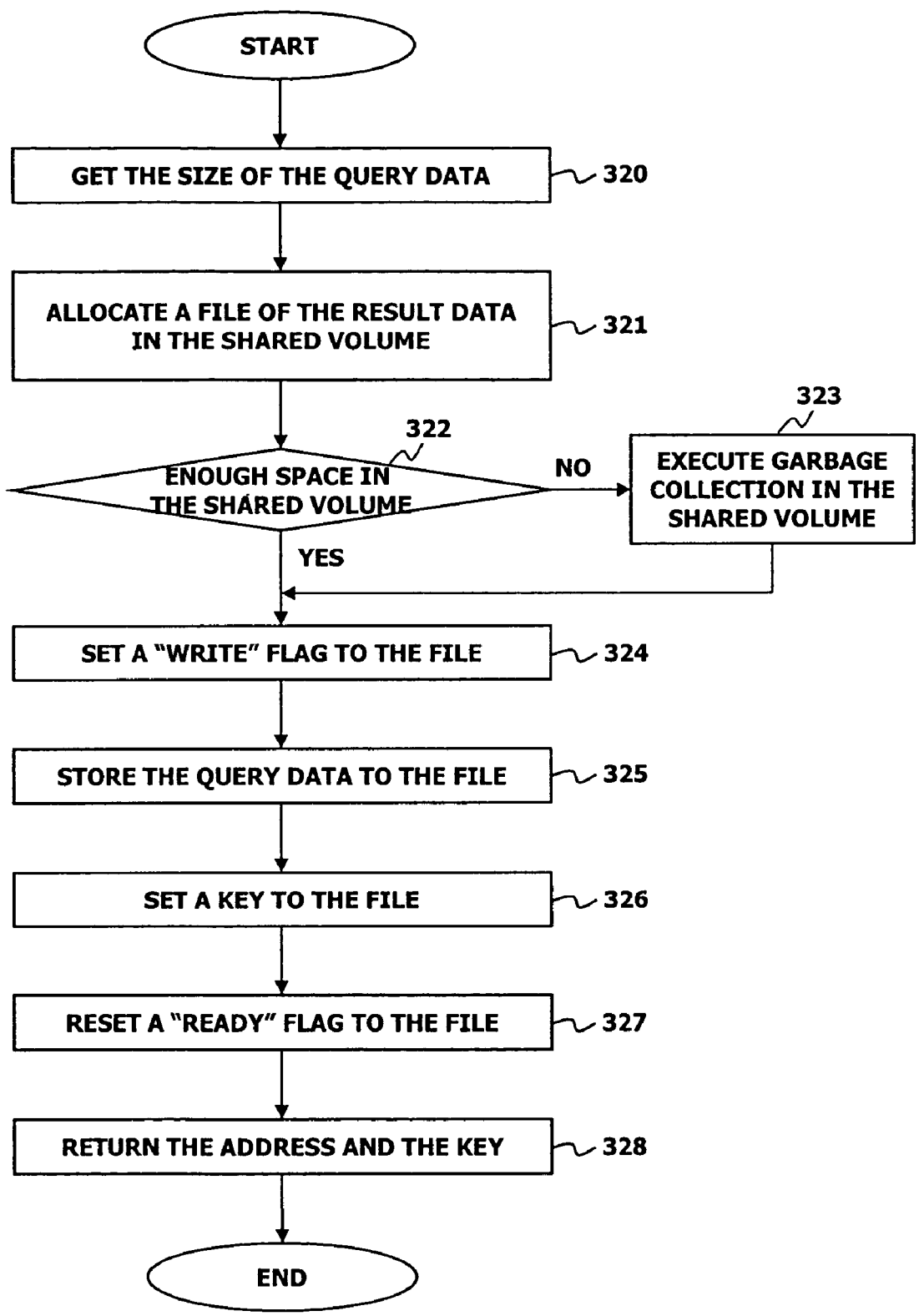
FIG. 12 is a flow diagram of a process for storing query data.

FIG. 12 is a flow chart of process 22$c$ in FIG. 3 in which the query data is stored in the shared volume. The process begins with the step of obtaining the size of the query data 320. If this has previously been determined in conjunction with the selection of the request path, then it is not necessary to be repeated. If it is not, then it is computed. As shown in step 321, once the size is determined, a suitable amount of file space in the shared volume 90$c$ is allocated. This is done by determining whether there is already enough space in the shared volume or not. As shown by step 322, if there is not, the garbage collection step 323, similar to step 223 in FIG. 9, is performed to make enough space. Once it is determined that enough space is available, the process sets the Write flag at step 324 to preclude access by any other process. The query data is then stored to the shared volume as shown by step 325. The data may be encrypted if desired. In step 326 a key is assigned to the file, which, like the key for the other data stored in the shared volume, is unique. As also described, a hash algorithm may be used to compute the key. After the data is written to the file the flag associated with that file is reset to "Ready" as shown by step 327. The address and the key are then returned at step 328.

Returning to FIG. 3, the query requestor 20$c$ includes a process 23$c$ for sending the address with the query through the LAN. This communication mechanism which transfers a request message from the application system to the database system is the same as discussed above with respect to FIG. 2 here. However, the request message only contains the address and the key of the query data file 93c, instead of the entire data query itself. As mentioned above, in addition, if more security is required on the network, the address and the key may be encrypted before they are transferred. The database system query receiver 50c includes a process 51c which receives the address with the query through the LAN. This is the same process as described above.

Figure 13:
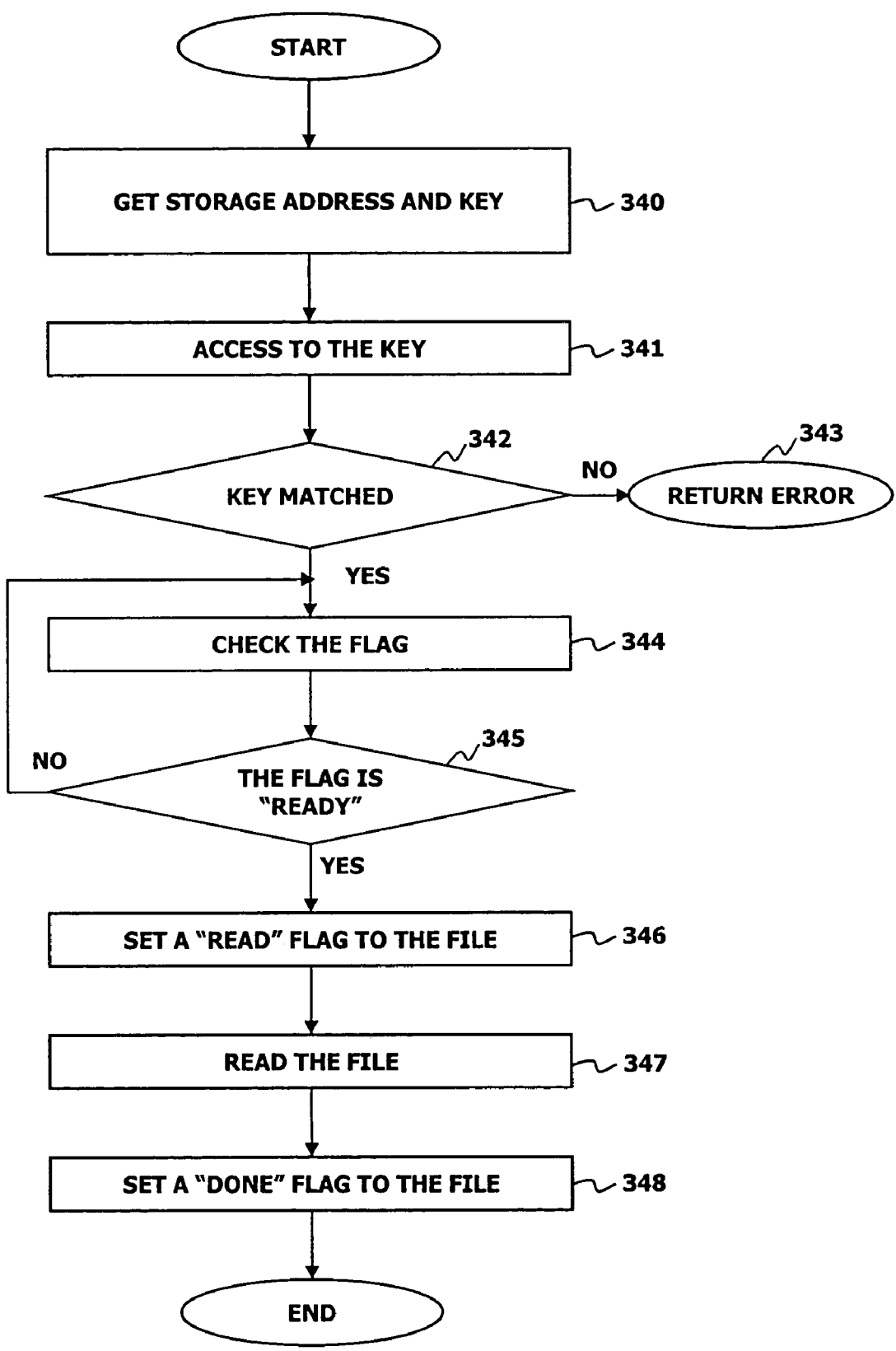
FIG. 13 is a flow diagram of a process for accessing query data.

Once this information has been received by the database system, the next step is to access the query data which is stored in the shared volume 90c. This is process 62c shown in block form in FIG. 3, and the details of its implementation are illustrated in FIG. 13. The process begins at step 340 with obtaining the storage address and the key from the application. The database system then checks to determine if there is a match for the key it received, as shown by step 341. Step 342 illustrates that if the key does not match, an error is returned. If the key does match, however, the flag is checked at step 344. This flag is accessed using the received address from the LAN. As discussed above, if the flag is not "Ready" the process continues checking the flag until it becomes ready (subject to a time out as discussed above). This mechanism allows both the application system and the database system to exclusively access the query data file, thereby guaranteeing data integrity.

As shown by step 345, once the flag is detected as "Ready" it is reset to be "Read" thereby locking out other processes from changing the data. The file is then read, being decrypted if necessary, at step 347, and then the flag is reset to "Done." As also discussed above, resetting the flag to "Done" enables the garbage collection step 323 to delete this file when additional space on the shared volume is required.

It will be apparent that the first embodiment and the second embodiment discussed in FIGS. 2 and 3 above may co-exist in the same system. In such a circumstance, it will mean that each of the application system and database system includes all the components described in conjunction with FIGS. 2 and 3. It will also mean that the shared volume contains both result data files and query data files.

Figure 4:
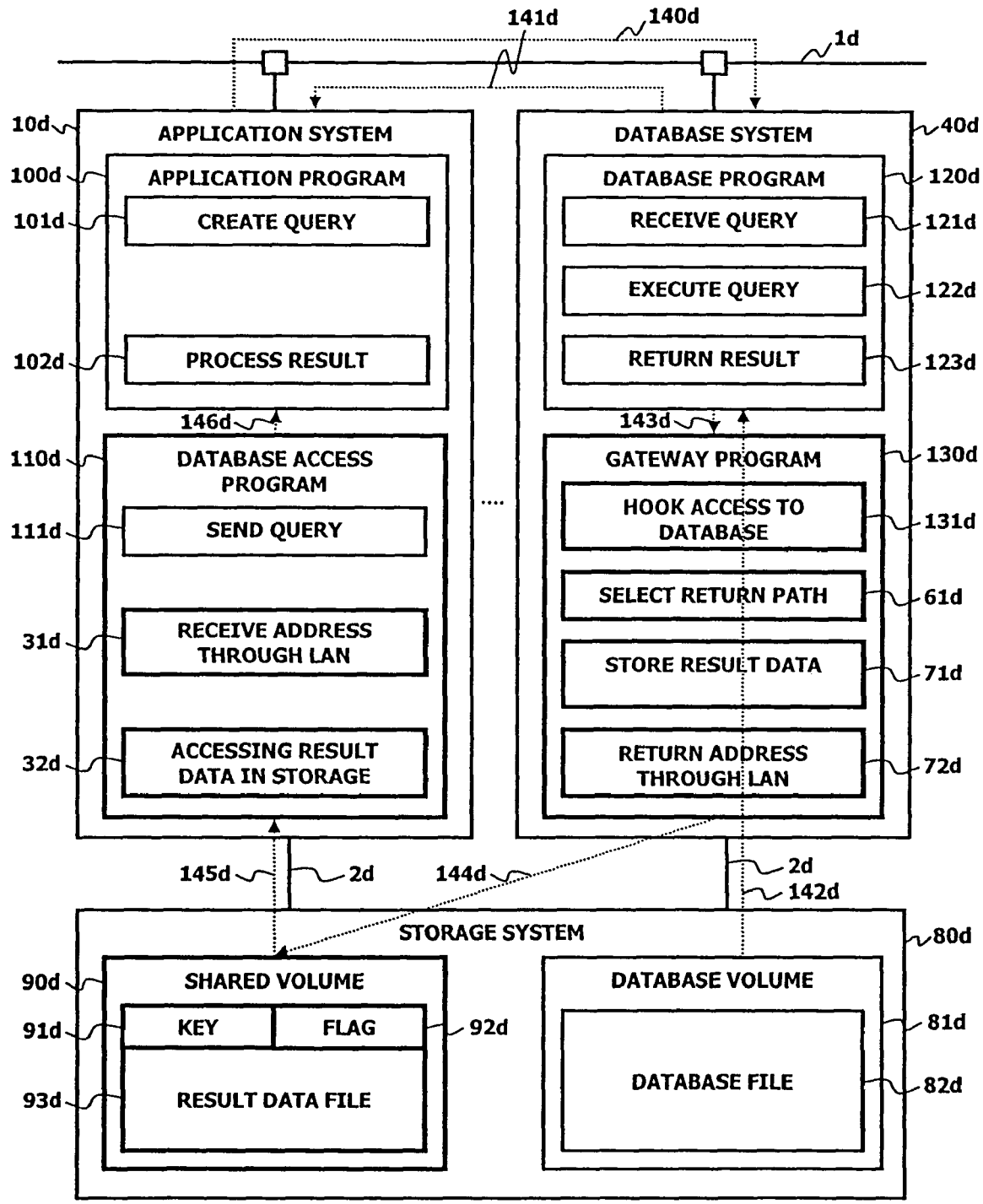
FIG. 4 is a block diagram of an embodiment in which database access and gateway software is employed to provide query results.

FIG. 4 depicts another embodiment of a system of this invention. The embodiment in FIG. 4 provides improved response time when large amounts of result data are requested from a request from a legacy application system made to a legacy database system. As shown by FIG. 4, the implementation is similar to that discussed in conjunction with FIGS. 2 and 3, however, there are some additional aspects as discussed below.

The application program 100d is the legacy program, and usually will contain a process 101d for creating a query and a process 102d for processing results. The database access program 110d residing in the application system, allows the application system 10d to have the full features of the system of this invention without need for introduction of a new application program. The application program 100d accesses the database system 40d through the database access program 10d. Examples of database access programs 110d are Open Database Connectivity (ODBC) drivers, Java Database Connectivity (JDBC) drivers, etc.

In this implementation the database access program 110d will typically include a process 111d for sending a query to the database through the LAN. It will also include a process 31d for receiving the address of the result data file from the database system through the LAN. This process will be the same process as process 31a described above. Database access program 110d will also typically contain a process 32d for accessing a result data file in the shared volume through the storage network. Preferably this process would be the same as process 32a also described above.

In this embodiment the database program 120d also preferably will be a legacy program. Usually it contains a process 121d for receiving a query from the application system, a process 122d for executing that query, and a final process 123d for returning the results of that query.

In this implementation a gateway program 130d is added to the database program 120d to allow the database system to have the features of this invention without need of introduction of a new database program. The gateway program 130d preferably includes a process 131d for "hooking" accesses to the database program 120d. This process 131d hooks every input/output transaction between the database program 120d and the application program 100d via the database access program 110d. The gateway also preferably contains a process 61d for selecting a return path for return of the result data. This process is preferably the same as process 61a. There will also be a process 71b for storing the result data to the shared volume through the storage network. This process is preferably the same as process 71a discussed above. Finally, the gateway program 130d will preferably also include a process 72d for returning the address and the key of the result data file from the gateway program 130d through the storage network. This process corresponds to process 72a discussed above.

The process flow for the embodiment depicted in FIG. 4 is shown by the dotted lines in FIG. 4. The process begins with a query request 140d from the application program 110d to the database program 120d via the database access program and the gateway program. Process 142d represents an access of the data in the database volume from the database program 120d. Process 143d illustrates the result data being passed from the database program 120d to the gateway program 130d. Process 144d illustrates storage of the result data file 93d in the shared volume from the gateway program. At the same time, the gateway program receives the address of the result data file 93d. Process 141d indicates the return of the address of the result data file 93d from the gateway program to the database access program 110b via the LAN. Process 145d illustrates access of the result data file using the address received from the LAN, while process 146d illustrates passing result data from the database access program 110d to the application program 100d, completing the query.

Figure 5:
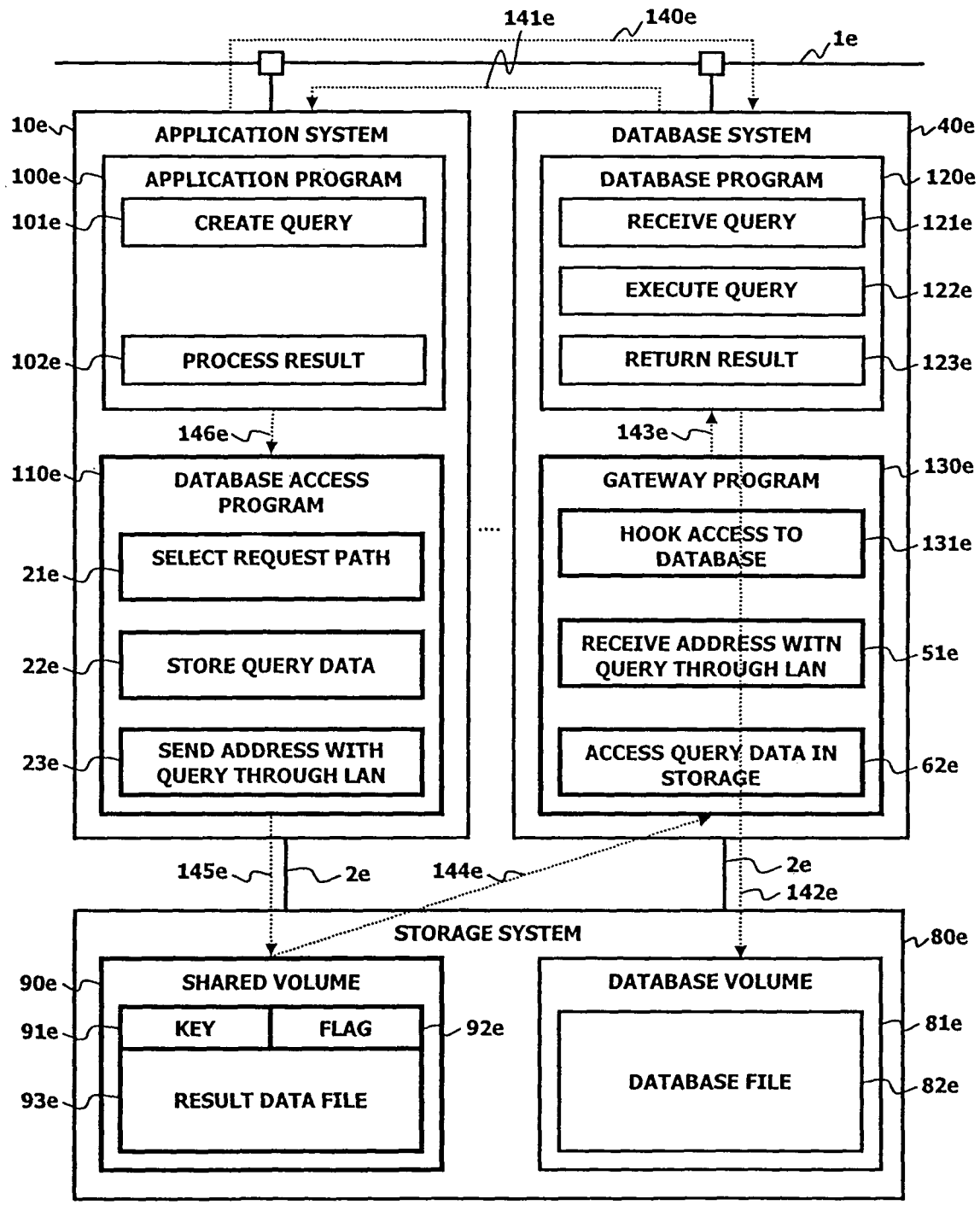
FIG. 5 is a block diagram of an embodiment in which database access and gateway software is employed to provide query data.

FIG. 5 is a block diagram of another embodiment of the invention. This embodiment improves the response time for sending extensive amounts of query data from an existing application system to an existing database system. As evident from FIG. 5, the overall system architecture is similar to the system discussed in the second and third embodiments (FIGS. 3 and 4) but there are some additional features as discussed below.

As shown by FIG. 5 the database access program 110e is added to the application program 100e to allow the application system to have full benefit of the ideas implemented by this invention without need for introducing a completely new application program. The application program 100e accesses database system through the database access program 110e. Examples of sample database access programs 110e are the ODBC and JDBC systems discussed above. The database access program 110e includes a process 21e for selecting a request path for sending query data to the database through the LAN. Process 21e typically will be the same as process 21c discussed above. It also includes a process 22e for storing query data to the shared volume in situations where the storage network is selected as the request path by process 21e. Process 22e will be the same as process 22c. Finally, the access program will include a process 23e to send both the address and the key of the query data file with the query itself to the database system through the LAN. Process 23e preferably will be the same as process 23c.

On the database side of the architecture, a gateway program 130e is added to allow the database system to have the full features of this invention without need for introduction of a new database system. Gateway program 130e preferably contains a process 131e for hooking accesses to the database program 120e. Process 131e will hook every input/output transaction between the database program and the application program. Process 51e receives the addresses and the key of the query data file with the query itself from the database access program 110e. Process 151e is preferably the same as process 51c. Process 131e is preferably the same as process 131d. Finally, the gateway program will also include a process 62e for accessing the query data in the shared volume using the address and the key. Process 62e is preferably the same as process 62c.

The dotted lines in FIG. 5 illustrate the overall process flow of the embodiment. The process flow begins with passing the query data 146e from the application program 100e to the database access program 110e. Process 145e illustrates the method by which the storing of the query data as a query data file from the database access program 110e to the shared volume is performed. At the same time the database access program 110e will receive the address of the result data file 93e. Next, step 140e illustrates that the query is supplied from the application system to the database system through the LAN. The query will contain the address of the query data file 93e. Process 144e illustrates access of the query data file using the address received over the LAN. Process 143e illustrates the passing of the result data from the gateway program 130e to the database program 120e. Next step 142e illustrates transfer of the query data to the database volume 81e, and finally step 141e illustrates a return of the result of the database process from the database system to the application system through the LAN.

Additionally, as discussed above with respect to the first and second embodiments (FIGS. 2 and 3), the third and fourth embodiments (FIGS. 4 and 5) may co-exist in the same system.

Figure 6:
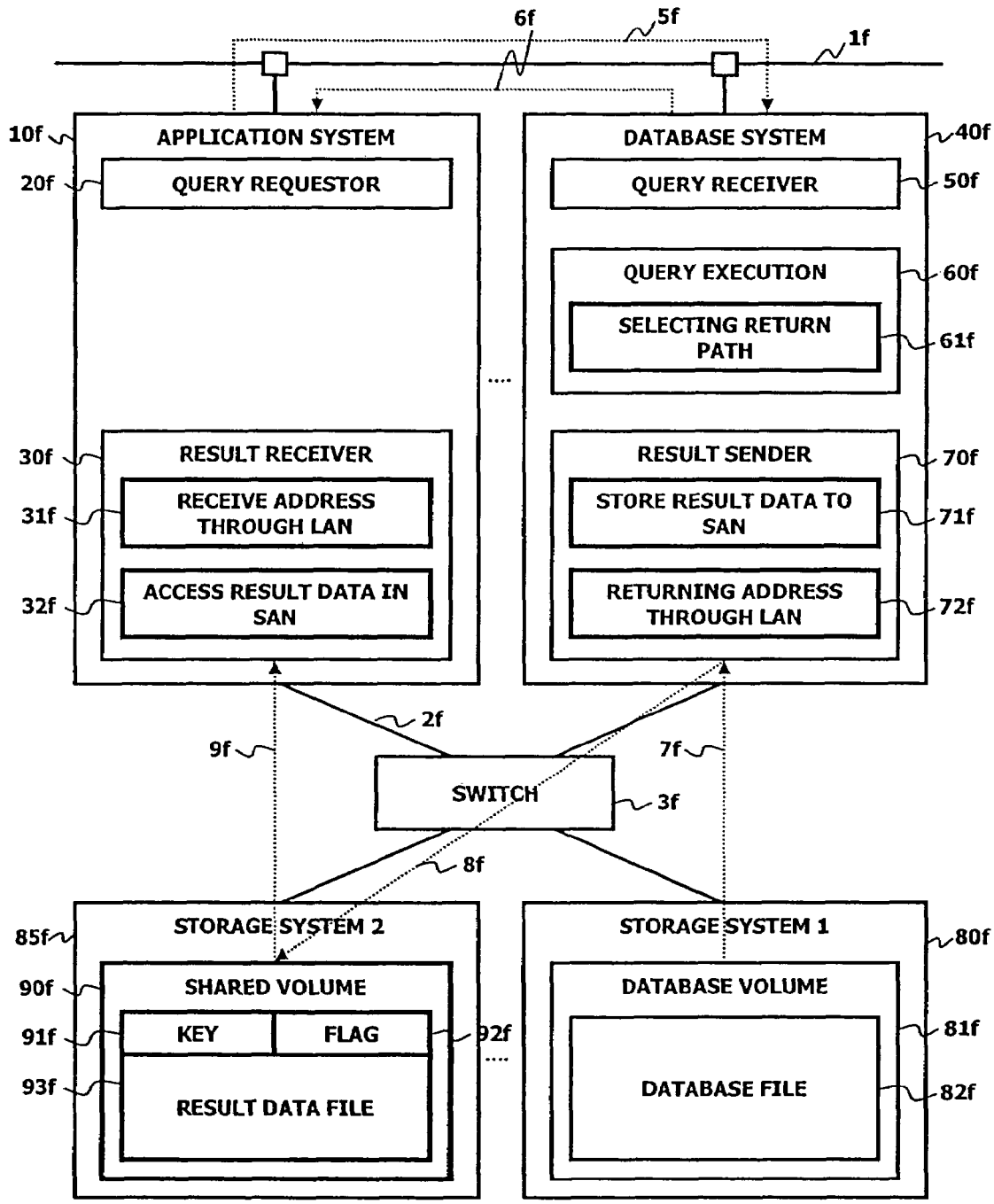
FIG. 6 is a block diagram of an embodiment in which a switch is used to couple the database system, application system and the storage network.

FIG. 6 illustrates another embodiment of the invention. This fifth embodiment employs a storage area network with a slightly different configuration than the embodiments discussed above. In particular, the fifth embodiment is similar to the first embodiment (FIG. 2) but a switch, such as a Fibre Channel, is used to interconnect the application system and the database system with the storage systems. A characteristic of this architecture is that several server based systems, such as the application system and the database system depicted in the figure may share several storage systems. Thus the shared volume 90f may be present in a different storage system than the storage system 80f which maintains the database volume 81f. As suggested above, this switch implementation also may be employed in conjunction with the embodiment of FIG. 2 and/or FIG. 3.

Usually in implementations such as this there will be a virtualization engine which allows the application system and the database system to treat the different storage systems as a logical single larger storage system. If this circumstance is not present, then all processes which access either storage system must maintain information regarding the address of the particular storage system, rather than relying upon the storage area network to do that. In such a circumstance each of the formatting, allocating and accessing steps requires specific addressing to be achieved. The operation and process flows for this fifth embodiment are the same as described above for the first embodiment. Each process flow either relies upon the virtualization engine, or provides the specific storage system address from which data is sought to be retrieved, or to which data is to be stored.

Figure 7:
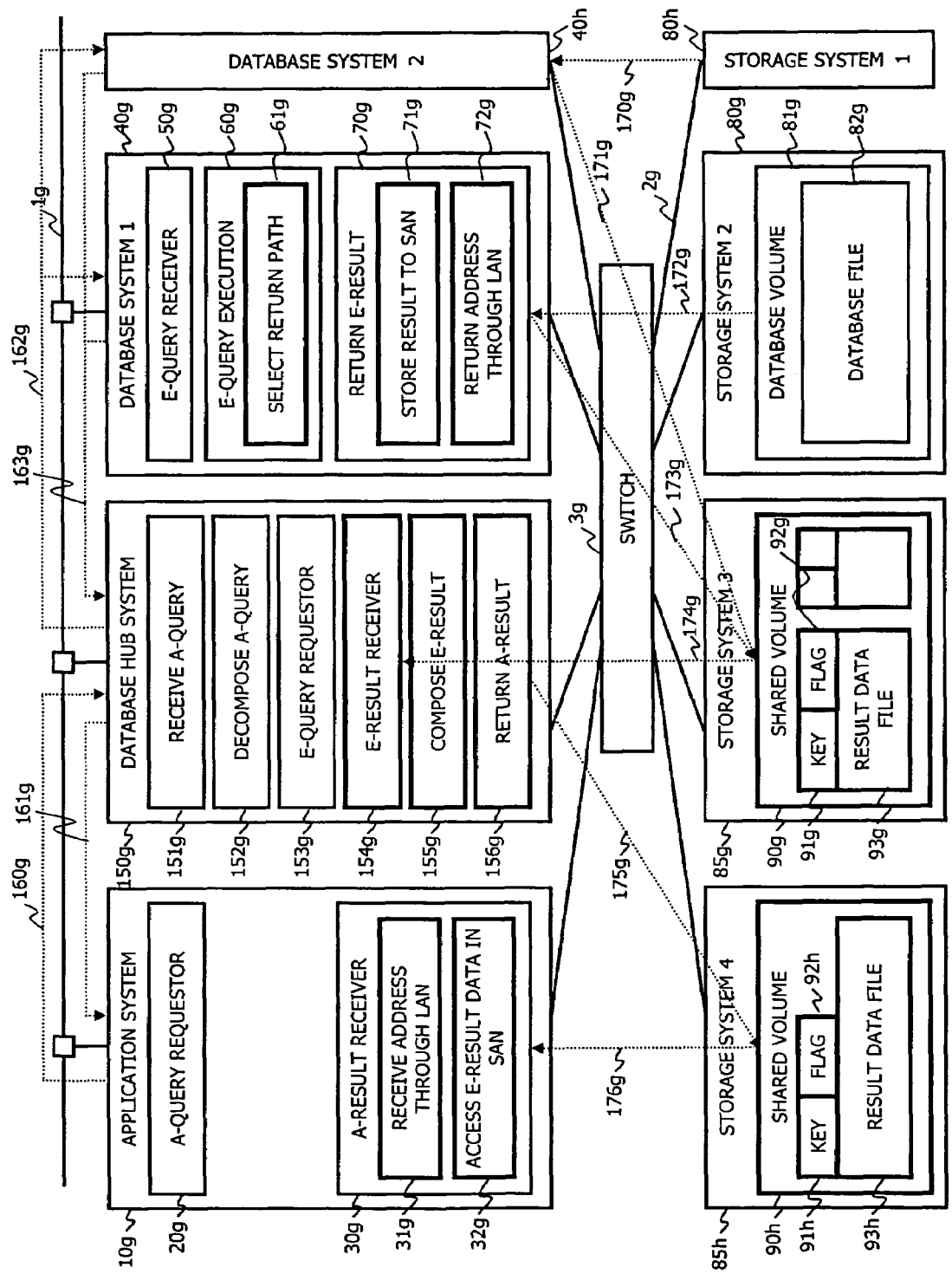
FIG. 7 is a block diagram of the system architecture of an embodiment in which a database hub system is employed.

FIG. 7 illustrates another embodiment of the invention. In this implementation, a database hub system 150g is added to the first embodiment (FIG. 2). The database hub system provides logical access paths to several external (whether existing or legacy) database systems such as system 40g and 40h. It also enables the application system to seamlessly access the different data sources. In current implementations database hub systems do not achieve high performance because they gather data from many sources through relatively low bandwidth LANs. In this embodiment, the database hub system 150g is able to query extensive data from many different sources at high speeds. In FIG. 7 the database hub system illustrated can be a well-known system such as the ISO Standard Sequential Query Language/Management of External System (SQLMED). Of course, the database hub implementation also may be employed in conjunction with the embodiment of FIG. 2 and/or FIG. 3.

In FIG. 7 the overall system architecture is similar to that of the first embodiment, but it includes additional components. The application system includes A-Query requestor 20g. A-Query means a query by the application. This is generated by the application program 10g and sent to the database hub 150g. The hub system includes a process for receiving the query 151g.

The database hub system 150g receives the A-Query and decomposes it to original E-Queries, meaning queries suitable for application to external databases. The particular decomposition technique will depend upon the particular databases involved. The process 153g sends the queries to the external databases, where they are received by process 50g in database system 40g. They are then executed by process 60g and a return path selected by process 61g. The process of returning the results 70g means that the database result data from the external databases is returned. These external database systems 40g store the result data to the shared volume 90g, and may include the result data gathered from several external databases. In addition, the database system returns the address of the query result data with the key 91g to the database hub system 150g through the LAN. As explained above, an appropriate flag 92g is set.

The E-Result receiver 154g receives the address of the query result data from each external database that the database hub system 150g requested. This key is checked and the flag set as described above. The E-result composer process 155g causes the database hub system 150g to access each query result data from each external database system through the storage area network. Then the database hub system 150g decomposes all query result data as the original A-Query originally requested. The process for returning the A-resolved data 156g provides composed query result data from all external query result data. The hub system stores the composed query result data to the shared volume and returns the address of that data with the key 91h to the application system. The flag 92h is also set as explained above. Finally, the A-result receiver 30g receives the address for the results data file 93h and accesses that file. The key is checked and the key is set as explained above.

As explained above, each of the embodiments of this invention provides unique advantages in comparison to prior art apparatus and systems for handling large amounts of query data or result data. Although preferred embodiments of the invention have been described above, the scope of the invention is defined by the following claims.

What is claimed is:

1. A system for enabling queries to a database to be processed comprising:
    a database system;
    an application system for providing SQL database queries to the database system, the database system coupled to the application system via a first connection over a network;
    a storage system having a shared volume to store results from SQL database queries made to the database system;
    a first data path to provide a data connection between the storage system and the application system, wherein the application system can directly access query results on the storage system without communicating via the first connection;
    a second data path to provide a data connection between the storage system and the database system, wherein the database system directly stores query results to the storage system via the second data path without communicating via the first connection; and
    a return path selector coupled to the database system for selecting a return path over which to return the results from queries made to the database system, the return path selector selecting from among at least the first connection over the network or the first data path between the storage system and the application system, wherein the return path selector determines a data path based upon one or more attributes of the query results;
    wherein, when the return path is chosen to be the storage system, the results are sent to the storage system as a file and an address in the storage system for the file is provided to the application system using the first connection; and
    wherein the file has associated therewith a key and the key is used to control access to the results, and also has associated therewith a flag to indicate status of the file, and wherein the flag indicates at least one of whether the file is being written, is ready to be read, is being read, and is available to be deleted.

2. A system as in claim 1 further comprising a request path selector coupled to the application system for selecting a request path over which to send query data comprising the SQL database queries made to the database system, the request path selector selecting from among at least the first connection or the storage system, wherein the key and flag are stored in the storage system.

3. A system as in claim 1 wherein the storage system is coupled to each of the application system and the database system using a switch.

4. A system as in claim 3 wherein a database hub system is used to couple the application system and the database system.

5. A system as in claim 1 wherein the results from the query have a size, and the return path selector chooses a return path based on the size of the results, and wherein said return selector compares the size of the results to a threshold to choose said result path, and said threshold is set based on a current workload of the LAN.

6. A system as in claim 5 wherein the return path selector chooses a return path based on a prediction of the size of the results, and wherein said prediction is based on similar queries from a query execution history.

7. A system as in claim 1 wherein the return path selector chooses a return path based on a measurement of throughput of the first connection.

8. A system as in claim 1 wherein after the results are used by the application system, the application system designates the results as used, thereby enabling them to be erased from the storage system at a later time.

9. A system as in claim 1 wherein after the query data is used by the database system, the database system reuses the query data for a further query.

10. A system as in claim 9 wherein after the query data is used by the database system, the database system designates the query data as used, thereby enabling them to be erased from the storage system at a later time.

11. A system as in claim 1 further comprising a hub system coupled to each of the application system and the database system.

12. A system for enabling queries to a database to be processed comprising:
    a database system;
    an application system for providing SQL database queries to the database system coupled to the application system via a first connection over a network;
    a storage system having a volume to store results from SQL database queries made to the database system;
    a first data path to provide a data connection between the storage system and the application system, wherein the application system can directly access query results on the storage system without communicating via the first connection;
    a second data path to provide a data connection between the storage system and the database system, wherein the database system directly stores query results to the storage system via the second data path without communicating via the first connection; and
    a request path selector coupled to the application system for selecting a request path over which to send query data comprising the SQL database queries made to the database system, the request path selector selecting from among at least the first connection over the network or the first data path between the storage system and the application system, wherein the request path selector determines a data path based upon one or more attributes of the query data;
    wherein, when the request path is chosen to be the storage system, the query data are sent to the storage system as a file and an address in the storage system for the file is provided to the database system using the first connection; and
    wherein the file has associated therewith a key and the key is used to control access to the results, and also has associated therewith a flag to indicate status of the file, and the flag indicates at least one of whether the file is being written, is ready to be read, is being read, and is available to be deleted.

13. A system as in claim 12 wherein the storage system is coupled to each of the application system and the database system using a switch.

14. A system as in claim 13 wherein a database hub system is used to couple the application system and the database system.

15. A system as in claim 12 wherein the query data have a size, and the request path selector chooses a request path based on the size of the query data, and wherein if there is not enough space in said storage system, garbage collection is performed before storing said query data to said storage system.

16. A system as in claim 12 further comprising a return path selector coupled to the database system for selecting a return path over which to return results from queries made to the database system, the return path selector selecting from among at least the first connection or the storage system.

17. A system as in claim 16 wherein the results from the query have a size, and the return path selector chooses a return path based on the size of the results, and wherein if there is not enough space in said storage system, garbage collection is performed before storing said query data to said storage system.

18. A system as in claim 12 wherein when the return path is chosen to be the storage system, the results are sent to the storage system as a file and an address in the storage system for the file is provided to the application system using the first connection.

19. A system for enabling queries to a database to be processed comprising:
   a database system;
   an application system for providing SQL database queries to the database system coupled to the application system via a first connection over a network, the application system including a database access system, and the database system including a gateway system;
   a storage system having a shared volume to store results from SQL database queries made to the database system;
   a first data path to provide a data connection between the storage system and the application system, wherein the application system can directly access query results on the storage system without communicating via the first connection;
   a second data path to provide a data connection between the storage system and the database system, wherein the database system directly stores query results to the storage system via the second data path without communicating via the first connection; and
   the gateway system including a return path selector for selecting a return path over which to return the results from queries made to the database system, the return path selector selecting from among at least the first connection over the network or the first data path between the storage system and the application system, wherein the return path selector determines a data path based upon one or more attributes of the query results;
   wherein, when the request path is chosen to be the storage system, the query data are sent to the storage system as a file and an address in the storage system for the file is provided to the database system using the first connection; and
   wherein the file has associated therewith a key and the key is used to control access to the results, and also has associated therewith a flag to indicate status of the file, and the flag indicates at least one of whether the file is being written, is ready to be read, is being read, and is available to be deleted.

20. A system as in claim 19 wherein the gateway system includes a request path selector for selecting a request path over which to send query data comprising the SQL database queries made to the database system, the request path selector selecting from among at least the first connection or the storage system.

21. A system for enabling queries to a database to be processed comprising:
   a database system;
   an application system for providing SQL database queries to the database system coupled to the application system via a first connection over a network, the application system including a database access system, and the database system including a gateway system;
   a storage system having a volume to store results from SQL database queries made to the database system;
   a first data path to provide a data connection between the storage system and the application system, wherein the application system can directly access query results on the storage system without communicating via the first connection;
   a second data path to provide a data connection between the storage system and the database system, wherein the database system directly stores query results to the storage system via the second data path without communicating via the first connection; and
   the database access system including a request path selector for selecting a request path over which to send data comprising the SQL database queries made to the database system, the request path selector selecting from among at least the first connection over the network or the first data path between the application system and the storage system;
   wherein, when the request path is chosen to be the storage system, the query data are sent to the storage system as a file and an address in the storage system for the file is provided to the database system using the first connection; and
   wherein the file has associated therewith a key and the key is used to control access to the results, and also has associated therewith a flag to indicate status of the file, and the flag indicates at least one of whether the file is being written, is ready to be read, is being read, and is available to be deleted.

22. A system for enabling queries to a database to be processed comprising:
   a database system;
   an application system for providing SQL database queries to the database system, the database system coupled to the application system via a communications network connection;
   a switch coupled to each of the database system and the application system;
   a storage system coupled to the switch, the storage system having a volume to store results from SQL database queries made to the database system;
   a first data path to provide a data connection between the storage system and the application system, wherein the application system can directly access query results on the storage system without communicating via the first connection;
   a second data path to provide a data connection between the storage system and the database system, wherein the database system directly stores query results to the storage system via the second data path without communicating via the first connection; and
   a return path selector coupled to the database system for selecting a return path over which to return the results from queries made to the database system, the return path selector selecting from among at least the communications network connection or the first data path between the storage system and the application system, wherein the return path selector selects a return path based upon one or more attributes of the query results;
   wherein when the return path is selected to be the storage system, the results are sent to the storage system as a file and an address in the storage system for the file is provided to the database system using the communications network connection;
   wherein the database system is configured to generate a key associated with the file for the results to identify their location, send the key over the network to the application, and encrypt at least one of the key and the results;

wherein the key is used to control access to the results, and also has associated therewith a flag to indicate status of the file, and wherein the flag indicates at least one of whether the file is being written, is ready to be read, is being read, and is available to be deleted.

23. A system as in claim 22 further comprising a request path selector coupled to the application system for selecting a request path over which to send query data comprising the SQL database queries made to the database system, the request path selector selecting from among at least the communications network connection or the switch, and wherein said return selector compares the size of the results to a threshold to choose said result path, and said threshold is set based on a current workload of the LAN.

24. A method of returning results to a query provider, the method for use in a system having a query provider which provides SQL database queries to a database system connected to the query provider by a first connection over a network, the query provider and the database system being each coupled to a storage system via different paths, the method comprising:

selecting a second connection, comprising a path from the query provider to the storage system, for storing results from SQL database queries made to the database system in the storage system as a file at an address which can be accessed separately by the query provider via the second connection independent of the network and by the database system via a third connection independent of the network, comprising a path from the database system to the storage system; and sending the address of the results in the storage system via the first connection over the network to the query provider;

generating a key for the results to identify their location, wherein the key is used to control access to the results, and also has associated therewith a flag to indicate status of the file, and wherein the flag indicates at least one of whether the file is being written, is ready to be read, is being read, and is available to be deleted; and sending the key over the network to the query provider.

25. A method as in claim 24 further comprising a step of, at the query provider, retrieving the results from the storage system.

26. A method as in claim 24 further comprising encrypting at least one of the key and the results.

27. A method as in claim 24 wherein the query provider provides query data comprising the SQL database queries to the database by storing the query data in the storage system at a location and sending information about the location over the first connection to the database system.

28. A method as in claim 24 further comprising, at the database system, the steps of:

retrieving the query data from the storage system; and using the query data to obtain the results.

29. A method as in claim 24 further comprising providing a flag associated with the results to indicate whether the results are ready to be read by the query provider.

30. A method as in claim 27 further comprising providing a flag associated with the results to indicate whether the results have been read by the query provider.

31. A method for use in a data storage system connected to an application system and a database system via a network, the method comprising:

receiving from the database system over the network, results of execution of SQL database queries, the SQL database queries being sent to the database system by the application system;

storing the results of execution of SQL database queries in a storage area that the database system and the application system can access separately via separate connections to the storage area, the separate connections comprising:

a first data path to provide a data connection between the storage system and the application system, wherein the application system can directly access query results on the storage system without communicating via the first connection; and a second data path to provide a data connection between the storage system and the database system, wherein the database system directly stores query results to the storage system via the second data path without communicating via the first connection;

determining a return path for the results of the execution of queries to the application system based upon one or more attributes of the results of the execution of queries; and sending, in response to a request from the application system, the results of execution of queries to the application system over the network if the network is determined to be the return path or returning an address in the shared volume for the results of the execution of the query if the shared volume is determined to be the return path;

the method further comprising:

generating a key for the results to identify their location, wherein the key is used to control access to the results, and also has associated therewith a flag to indicate status of the file, and wherein the flag indicates at least one of whether the file is being written, is ready to be read, is being read, and is available to be deleted;

sending the key over the network to the query provider; and encrypting at least one of the key and the results.

32. A method comprising:

sending an SQL database query, in a system having an application system, a database system connected to the application system via a first network connection, a return path selector coupled to the database system for selecting a return path over which to return the results from queries made to the database system, and a data storage system connected to the application system via a first data path and connected to the database system through a second data path, the first data path providing a data connection between the data storage system and the application system through which the application system can directly access query results on the data storage system without communicating via the first connection, and the second data path providing a data connection between the data storage system and the database system through which the database system directly stores query results to the data storage system via the second data path without communicating via the first connection, from the application system to the database system by using the first network connection;

selecting a return path over which to return the results from SQL database queries made to the database system from among at least the first network connection or the first data path between the storage system and the application system, wherein the return path selector determines the return path based upon one or more attributes of the query results;

storing a result of execution of the query in a shared volume of the data storage system that can be accessed by the application system via the first data path and by the database system via the second data path; and obtaining at the application system, the result of execution of the query from the storage system via the first data path without going through the first connection over the network;

the method further comprising:

generating a key for the results to identify their location, wherein the key is used to control access to the results, and also has associated therewith a flag to indicate status of the file, and wherein the flag indicates at least one of whether the file is being written, is ready to be read, is being read, and is available to be deleted;

sending the key over the network to the query provider; and encrypting at least one of the key and the results.

33. The method of claim 32, wherein the first connection is a Local Area Network, and wherein the second connection is a Storage Area Network.

* * * * *